United States Patent [19]
Suzuki

[11] Patent Number: 6,005,637
[45] Date of Patent: Dec. 21, 1999

[54] IMAGE TRANSMISSION SYSTEM HAVING A MESH SETTING DEVICE

[75] Inventor: Akitoshi Suzuki, Yokohama, Japan

[73] Assignee: Nikon Corporation, Tokyo, Japan

[21] Appl. No.: 08/589,541

[22] Filed: Jan. 22, 1996

[30] Foreign Application Priority Data

Jan. 23, 1995 [JP] Japan .................................. 7-007795

[51] Int. Cl.⁶ .................................................. H04N 9/74
[52] U.S. Cl. ........................ 348/584; 348/589; 348/600; 348/239
[58] Field of Search ................................... 348/578, 584, 348/589, 468, 593, 600, 12, 13–18, 239; 378/4; 395/924; 382/131; 364/474.19; 345/115, 116, 2; H04N 9/74

[56] References Cited

U.S. PATENT DOCUMENTS

| | | | |
|---|---|---|---|
| 3,580,993 | 5/1971 | Sandorf ................................... | 348/584 |
| 4,716,404 | 12/1987 | Tabata et al. ............................ | 340/723 |
| 5,005,126 | 4/1991 | Haskin .................................. | 364/413.13 |
| 5,250,933 | 10/1993 | Beaudin et al. ......................... | 345/115 |
| 5,396,281 | 3/1995 | Maeda ..................................... | 348/141 |
| 5,432,525 | 7/1995 | Maruo et al. .............................. | 345/2 |
| 5,598,223 | 1/1997 | Leroux et al. .......................... | 348/589 |
| 5,621,459 | 4/1997 | Ueda et al. .............................. | 348/239 |
| 5,680,150 | 10/1997 | Shimizu et al. ........................ | 345/115 |

FOREIGN PATENT DOCUMENTS

| | | |
|---|---|---|
| 0 476 533 A2 | 3/1992 | European Pat. Off. . |
| 2 636 754 | 3/1990 | France . |
| 2 151 100 | 7/1985 | United Kingdom . |
| 2 224 187 | 4/1990 | United Kingdom . |

Primary Examiner—Michael H. Lee

[57] ABSTRACT

An image communication system for displaying a subject image imaged by a camera unit locally and at a remote location for discussion of the subject image via telephone or other communication device. The image communication system includes an image transmission device to form mesh image data representing a mesh image and to synthesize the mesh image data with subject image data representing the image of the subject to form synthesized image data for transmission to a remote location. The mesh image data is set by a mesh setting device and synthesized with the subject image data by an image synthesis circuit such that the mesh image is superimposed upon the subject image. The mesh image may be set and synthesized with the subject image at either of the subject image transmission location or the remote location. Further, the mesh image may be modified at either the transmission location or the remote location.

27 Claims, 8 Drawing Sheets

IMAGE TRANSMISSION SYSTEM HAVING A MESH SETTING DEVICE

BACKGROUND OF THE INVENTION

1. Field of the Invention

The present invention relates to an image transmission device and an image transmission system. More particularly, the present invention relates to an image transmission device and a system utilizing the image transmission device to transmit images photographed by a television camera, such as a CCD camera, to remote locations, and to observe the same image at multiple separate locations.

2. Description of the Related Art

Devices are known which allow a person at a remote location to observe an image of a subject transmitted from another location. For example, devices are known which allow specialists at remote locations to observe a pathological examination by transmitting a subject image to the remote locations. The subject image is displayed on a television monitor at the location from which the subject image is transmitted (transmission location) and the subject image is also displayed at the remote location (reception location). The image displayed on the respective television monitors can then be discussed via telephone.

The above-described type of image transmission device is disclosed, for example, in Japanese Laid-Open Utility Model Hei 4-11960, Japanese Laid-Open Utility Model Hei 4-119184, and Japanese Laid-Open Patent Publication Number Hei 5-176226. However, it is difficult to accurately refer to particular parts of a displayed subject image with the known types of image transmission devices. Specifically, when discussing a part of the image displayed at one location, e.g., the transmission location, it may be difficult to accurately ascertain, at the reception location, the part of the subject image being discussed.

Therefore, to refer to particular parts of a displayed image, an arrow-like indicator which is manipulated using a mouse is synthesized on the image of the subject in the television monitor. By projecting the arrow-like indicator on the same part of the subject image at both the transmission location and the reception location, it becomes possible to accurately refer to a particular part of the subject image being discussed. Moreover, by displaying the tracks of the arrow-like indicator, it becomes possible to indicate a part of a subject which should be cut, or to clearly designate a necessary range while discussing a subject.

It is comparatively convenient to indicate specific locations on the subject with the arrow-like indicator projected on the image transmission device and which moves freely on the screen of the television monitor. However, during a pathological examination, for example, when giving directions from a remote location regarding preparing a specimen from an organ at a transmission location, it is sometimes difficult to indicate the exact location and direction of a cut. Therefore, a system is needed for conveniently and accurately referring to locations on a subject image which is transmitted to a remote location for observation.

SUMMARY OF THE INVENTION

It is an object of the present invention to provide an image transmission system for transmitting an image of a subject to a remote location.

It is another object of the present invention to provide an image transmission system having a device for accurately referring to a part of a subject image transmitted to a remote location.

Objects and advantages of the present invention are achieved with an image communication system for displaying a subject image produced by a camera unit, having an image transmission device to form mesh image data representing a mesh image and to synthesize the mesh image data with subject image data representing the image of the subject to form synthesized image data for transmission. By synthesizing the mesh image and the subject image and displaying the synthesized image on television monitors locally (at the location of the camera unit) and remotely the subject image can be discussed while using the mesh image to refer to portions of the subject image.

Objects and advantages of the present invention are also achieved with an image communication system including a television camera to produce subject image data representing a subject image. The subject image data produced by the television camera is stored in an image data memory. A mesh setting device sets a mesh image comprised of multiple parallel and equidistant straight lines to be superimposed on the subject image. The mesh setting device sets a distance between the straight lines, a number of the straight lines and an angle of inclination of the straight lines comprising the mesh image. The mesh image data forming the mesh image is stored in a mesh memory, and an image synthesis device synthesizes the image data stored by the mesh memory and the image data stored by the image data memory. The synthesized image data is displayed on a television monitor locally, and is transmitted to a remote location to be displayed at the remote location.

Objects and advantages of the present invention are also achieved with an image communication system including a television camera to produce subject image data representing a subject image wherein the subject image is to be displayed locally and remotely by the image communication system. The image communication system also includes a first communication device having a first data image memory to store the subject image data produced by the television camera, a first mesh setting input device to form mesh image data comprising parallel and equidistant straight lines, wherein the number of straight lines, the distance between the straight lines and the angle of inclination of the straight lines are optionally set, a first mesh memory to store the mesh image data set by the mesh setting input device, a first image synthesis device to synthesize the mesh image data stored by the mesh memory and the subject image data stored by the image memory, a first television monitor to receive the synthesized image data and to display an image corresponding to the synthesized image data, and a first transmission control device to transmit the synthesized image data. The image communication system also includes a second communication device to receive the synthesized image data transmitted from the first communication device, the second communication device including a second transmission control device to receive the synthesized image data from the first transmission control device, and a second television monitor to display an image corresponding to the image data received by the second transmission device. The second communication device may also include a second image data memory to store the subject image data, a second mesh memory to store the mesh image data, a second mesh setting input device to form mesh image data comprising parallel and equidistant straight lines, and a second image synthesis device to synthesize image data stored by the second mesh memory and the second image data memory, wherein the mesh image displayed on the first and second television monitors is settable by any one of the first mesh setting input device and the second mesh setting input device.

Objects and advantages of the present invention are also achieved with an image communication system including a camera to produce subject image data representing a subject image, and a first communication device to transmit the subject image data. The first communication device including a first image memory to store the subject image data, and a first transmission control device to transmit the subject image data. A first television monitor displays the subject image. The image communication system also includes a second communication device to receive the subject image data transmitted from the first transmission control device. The second communication device includes a second image memory to store the subject image data received by the second communication device, a first mesh setting device to form mesh image data comprising parallel and equidistant straight lines, a first mesh memory to store the mesh image data formed by the first mesh setting device, a first image synthesis device to synthesize the image data stored by the first mesh memory and the image data stored by the second image memory, and a second transmission control device to transmit the synthesized image data to the first communication device. A second television monitor receives the synthesized image data from the first image synthesis device and displays a synthesized image. The synthesized image is also transmitted to the first communication device via the second transmission control device to display the synthesized image on the first television monitor. The first communication device may also comprise a second mesh memory for storing mesh image data transmitted from the first mesh setting device, and a second image synthesis device to synthesize the mesh image data stored in the second mesh memory with the subject image data stored in the first image memory.

Objects and advantages of the present invention are also achieved with an image communication system to transmit a subject image to a remote location, comprising a camera unit to form subject image data representing a subject image, an image memory to store the subject image data, a mesh setting device to set mesh image data to form a mesh image, a mesh memory to store the mesh image data set by the mesh setting device, an image synthesis circuit to synthesize the mesh image data and the subject image data to form a synthesized image, a transmission device to transmit the synthesized image, and a television monitor to display an image corresponding to the synthesized image data. The mesh setting device may comprise a first mesh input switch at a subject image transmission location to set mesh setting information to set the mesh image data, a first mesh control circuit at the subject image transmission location to form mesh image data based on the mesh setting information set by the first mesh input switch, and a second mesh control circuit at a subject image reception location to form mesh image data based on the mesh setting information set by the first mesh input switch. The mesh setting device may comprise a first mesh setting device at a subject image transmission location to set the mesh image data and a second mesh setting device at a subject image reception location to set the mesh image data, wherein the first and second mesh setting devices independently set the mesh image data. The mesh setting device may also comprise a first mesh input switch at a subject image reception location to set mesh setting information to set the mesh image data, a first mesh control circuit at the subject image reception location to form mesh image data based on the mesh setting information set by the first mesh input switch, and a second mesh control circuit at a subject image reception location to form mesh image data based on the mesh setting information set by the first mesh input switch.

The mesh setting device in accordance with embodiments of the present invention includes a mesh input switch to set mesh setting information for setting mesh image data comprising multiple parallel and equidistant straight lines, including the number of straight lines, the distance between the straight lines and the angle of inclination of the straight lines. The mesh setting device also includes a mesh control circuit to form the mesh image data in accordance with the mesh setting information set by the mesh input switch. The mesh setting information may also include an ordered code associated with respective straight lines comprising the mesh.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
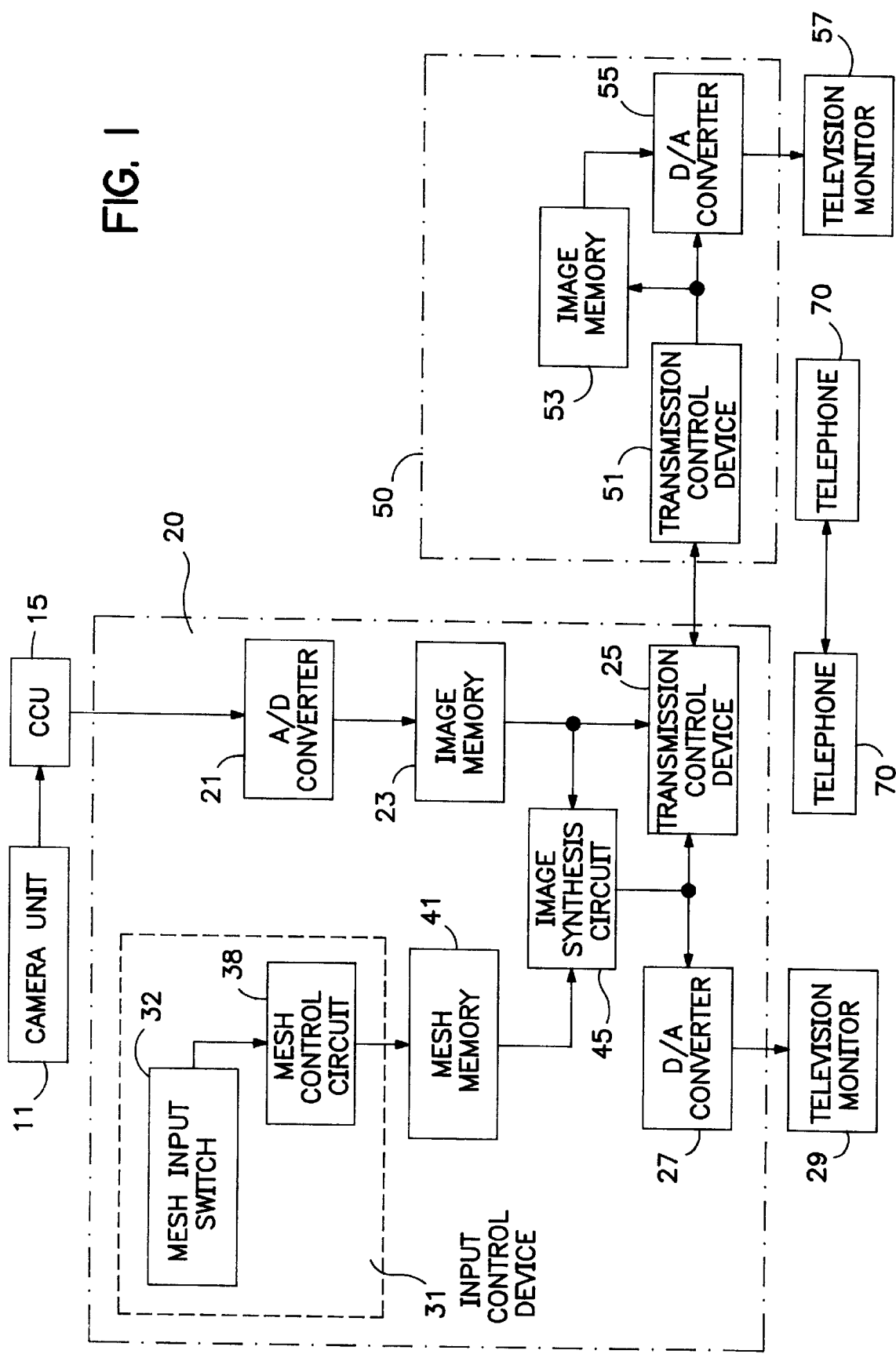
FIG. 1 is a block diagram of an image transmission system in accordance with a first embodiment of the present invention.

Reference will now be made in detail to the preferred embodiments of the present invention, examples of which are illustrated in the accompanying drawings wherein like reference numerals refer to the same or similar elements throughout.

Figure 2:
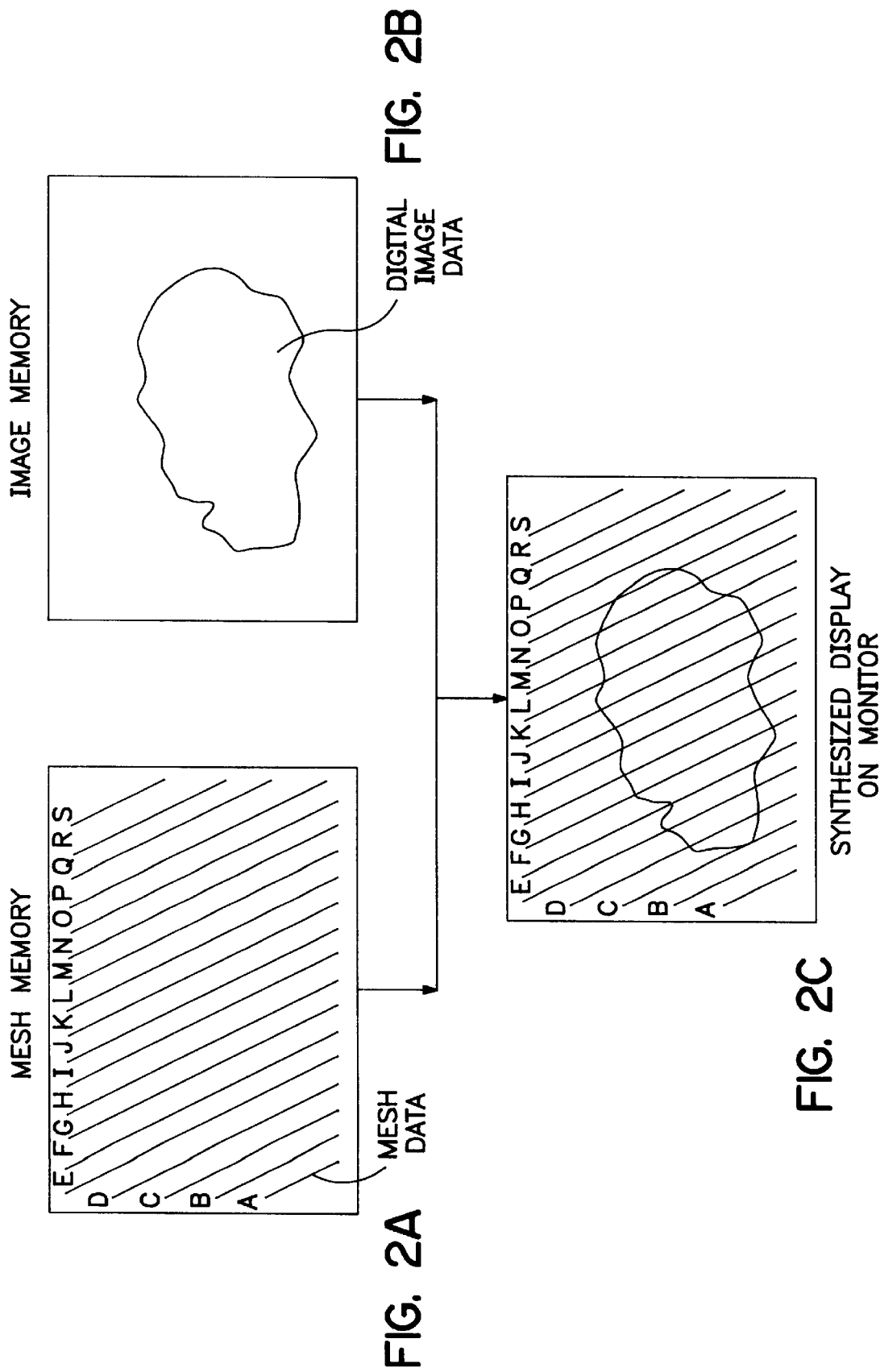
FIGS. 2A–2C are diagrams showing the synthesis of subject image data and mesh image data in accordance with embodiments of the present invention.

FIG. 1 is a block diagram of an image transmission system in accordance with a first embodiment of the present invention. As shown in FIG. 1, a camera unit 11, at a location from which a subject image is transmitted, and having a device for converting optical image signals into analog image signals, such as a charge coupled device (CCD), outputs analog image signals representing the subject image to a camera control unit (CCU) 15. The analog image signals from the CCU 15 are input to an image transmission device 20. The analog image signals received from the camera control unit 15 are converted to digital image data by an analog-to-digital (A/D) converter 21 in the image transmission device 20. The digital image data from the A/D converter 21 is then stored in an image memory 23 for image data storage. The image data stored in the image memory 23 is transmitted, via a transmission control device 25, to a transmission device 50 at a remote location (hereinafter referred to as "reception location") using a telephone circuit, such as an integrated services digital network (ISDN). FIG. 2B shows an example of an image produced from digital image data stored in image memory 23, as described above.

The image transmission device 20 also includes an input control device 31 for entering mesh data settings. The mesh data is image data representing multiple straight lines that are parallel and equidistant. The input control device 31 comprises a mesh input switch 32 and a mesh control circuit 38, described in more detail below. Furthermore, the image transmission device 20 includes a mesh memory 41 for storing the mesh image data set by the input control device 31; an image synthesis circuit 45 which forms a synthesized image signal by combining the mesh image data stored in memory 41 and the subject image data stored in image memory 23; a digital-to-analog converter 27, and a television monitor 29 to display the synthesized image.

FIG. 2A shows an example of the mesh image data stored in mesh memory 41. As shown in FIG. 2A, the mesh image data is for the purpose of displaying multiple parallel and equidistant straight lines.

Figure 3:
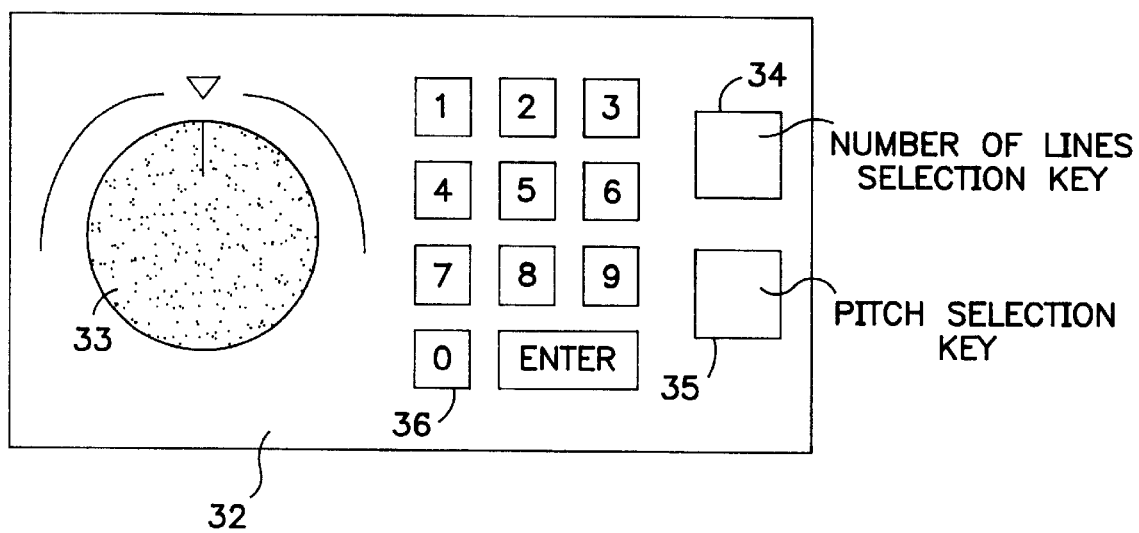
FIG. 3 is a diagram showing the external appearance of the mesh input switch in accordance with embodiments of the present invention.

The mesh input switch 32 will now be described in more detail with reference to FIG. 3. The mesh input switch 32 includes an inclination setting knob 33, a line number selection key 34, a pitch selection key 35 and a ten key input device 36. As will be described in detail below, by manipulating the knobs and keys, information for setting the mesh is transmitted from the mesh input switch 32 to the mesh control circuit 38. The mesh control circuit 38 forms digital image data based on the mesh setting information optionally set by the mesh input switch 32.

The inclination setting knob 33 changes the inclination of the parallel lines which comprise the mesh according to the rotational angle of the knob 33. Specifically, the inclination of the parallel lines forming the mesh are changed by rotating the inclination setting knob 33 by a specified rotational angle which corresponds to the amount of inclination of the mesh parallel lines. In accordance with embodiments of the present invention, the mesh displayed on the television monitor can have a right inclination, as shown in FIG. 2A, or a left inclination (not shown in the figure) by rotating the inclination setting knob 33. The ten key input device 36 sets the number of the lines in the mesh. By manipulating a line number selection key 34 while setting the number of lines using the ten key input device 36, the mesh control circuit 38 forms image data for displaying a number of equidistant straight lines equivalent to the numeric value set by the ten key input device 36, and which have an inclination corresponding to the rotational angle of inclination setting knob 33. By varying the number of lines set by line number selection key 34 and ten key input device 36, the distance between lines, specifically, the pitch, can be adjusted.

Moreover, if a numeric value is input using the ten key input device 36, while the pitch selection key 35 is manipulated, the parallel mesh lines are set at a distance corresponding to the numeric value input by the ten key input device 36. Accordingly, the mesh control circuit 38 forms image data for displaying the parallel straight lines of the mesh having an inclination corresponding to the rotational angle of the inclination setting knob 33 and a distance between lines corresponding to the numeric value entered by ten key input device 36. As described above, the mesh image data formed by mesh control circuit 38 is stored in mesh data memory 41.

The image synthesis circuit 45 receives mesh image data from the mesh memory 41 and subject image data from the image memory 23 and creates image signals by synthesizing the mesh image data and the subject image data. The synthesized image data is converted by D/A converter 27 into analog image signals. The analog image signals from DIA/converter 27 are displayed by television monitor 29 to display an image which superimposes multiple straight lines arranged in parallel at equal distances on the image of the subject that is photographed by camera unit 11. FIG. 2C shows an example of a synthesized image.

The synthesized image signals are transmitted by the transmission control device 25 to the transmission device 50 at the reception location. The synthesized image data received by the transmission device 50 at the reception location passes through a transmission control device 51 and is stored in an image memory 53. Further, the synthesized image data that passes through the transmission control device 51 is converted by a D/A converter 55 into analog image signals which can be displayed on a television monitor 57. The subject image on which the mesh is superimposed can be seen on the television monitor 57 at the reception location in the same manner as it is seen on the television monitor 29 at the image transmission location. According to the image transmission system described above, the same image can be viewed at both the image transmission location and image reception location, and discussion of the displayed image can be conducted via telephone 70, or other communication devices, at the transmission and reception locations. Locations on the subject, for example, a location can be suitably specified based on the straight lines comprising the mesh which are superimposed over the displayed subject image.

Moreover, as shown in FIGS. 2A and 2C, image data including codes can be formed by the mesh control circuit 38 to display an alphabetic code (A, B, C, etc. . . . ) or numeric code, or any similar identifying code, associated with the straight lines comprising the mesh. By displaying a code associated with the respective lines comprising the mesh, when specifying a position on the subject that is displayed on the television monitor by referring to the straight lines, the designation of that position can be made quickly and easily.

Although the communication between the image transmission location and the reception location has been described as via an ISDN, the direct connection between the transmitting location and the reception location is not limited to telephone circuits such as ISDN, and other suitable circuits, such as custom communication circuits may also be used. When custom communication circuits are used, the transmission control device 25 of the transmission location and the transmission control device 51 of the reception location are joined to the communications circuit.

In accordance with the first embodiment of the present invention, when the image of the subject is displayed on the television monitor, multiple parallel and equidistant straight lines (the mesh) are superimposed on the subject image on the television monitor screen. The inclination of the mesh lines, the number of mesh lines and the distance between the mesh lines can be set and easily modified, allowing a subject location, such as a cut location, to be suitably indicated.

Further, it is possible to add codes to the display of the mesh straight lines displayed on the television monitor, and when pointing out locations on the subject, such as a cut location and a direction of the cut, etc., the position and direction can be specified quickly and easily.

Accordingly, an image having the same superimposed mesh can be displayed on television monitors at the transmission location and reception location, and the directions and confirmation of the subject cut location can be suitably conducted.

Figure 4:
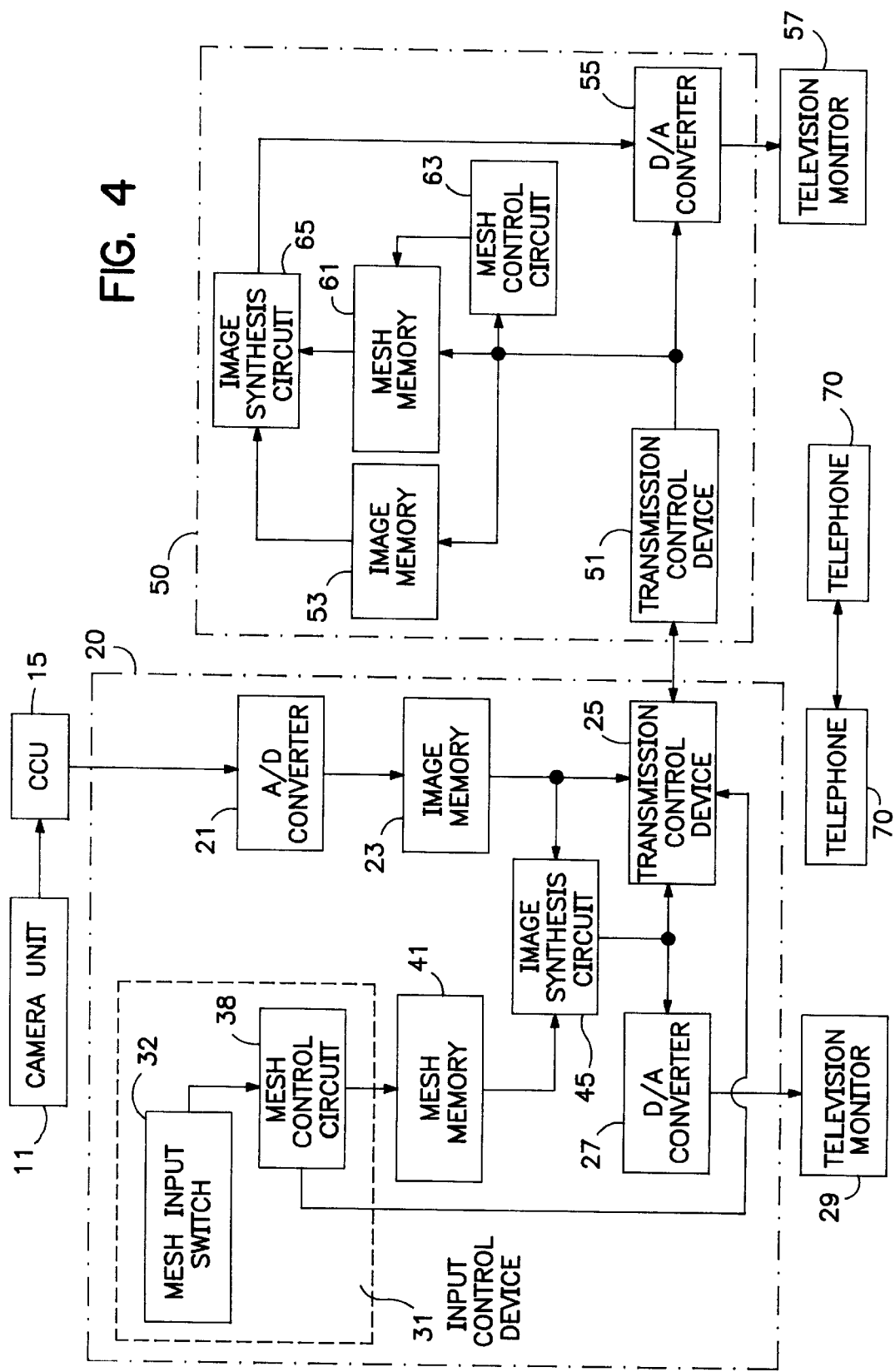
FIG. 4 is a block diagram of an image transmission system in accordance with a second embodiment of the present invention.

FIG. 4 is a block diagram of an image transmission system in accordance with a second embodiment of the present invention. Like elements in the first and second embodiments are referred to by like reference numerals.

As shown in FIG. 4, an output of the input control device 31 is passed directly to the transmission control device 25 and is sent to transmission device 50 at the reception location. The mesh setting information from input control device 31 which stipulates the distance between, the number of and the angle of inclination of the mesh straight lines are thereby transmitted directly to the subject image reception location.

In accordance with the second embodiment of the present invention, the image transmission device 50 at the reception location includes a mesh memory 61 for storing the mesh information, a mesh control circuit 63, and an image synthesis circuit 65 in the same manner as the image transmission device 20 at the transmission location. Accordingly, if the inclination of the mesh, the pitch, or the number of lines has been modified by the input control device 31 at the transmission location, it is possible to transmit only the mesh setting information to the reception location. By transmitting only the modified mesh setting information to the reception location without also transmitting the image data, the mesh may be modified quickly. Specifically, since the mesh setting information involves an extremely small amount of data in comparison with the amount of image data, the mesh data may be modified and transmitted quickly to the reception location without transmitting the synthesized subject image data and mesh image data.

The transmitted mesh setting information is input into the mesh control circuit 63 to form the mesh image data. The mesh image data formed by mesh control circuit 63 is stored in a mesh memory 61. The image data stored in frame memory 23 at the transmission location has already been transmitted and stored in image memory 53. The image synthesis circuit 65 synthesizes the subject image data stored in image memory 53 and the mesh image data stored in mesh memory 61. The synthesized image data passes through D/A converter 55, and is displayed on television monitor 57. Thus, in accordance with the image transmission system of the second embodiment of the present invention, the same mesh is superimposed on the subject image at the reception location and at the transmission location and displayed on television monitor 29 at the transmission location and television monitor 57 at the reception location.

Generally, when data is transmitted using a communications circuit, there is a limit to the amount of data transmission per unit of time. In particular, when transmitting image data via a communications circuit a relatively large amount of time is required, in comparison to the time required to transmit other data, because a large volume of data is generally required to represent an image. Because the transmission location transmission device 20 and the reception location transmission device 50 are connected via a communications circuit, the transmission of the image data takes a relatively long time period. Therefore, once the subject image data and the mesh image data have been transmitted to the reception location, if the mesh setting is modified at the transmission location, the new mesh setting information can be quickly sent to the reception location by sending only the modified mesh setting information to the reception location, rather than sending the synthesized image data of the subject image and the mesh image.

In accordance with the second embodiment of the present invention, by making adjustments at the transmission location to change any of the distance between lines, number of lines and angle of inclination of the mesh, the mesh setting modifications at the transmission location are immediately transmitted to the reception location so that the modified mesh is immediately superimposed on the subject image at the reception location. As a result, discussions regarding a subject image can be conducted efficiently and instructions given without delay. Furthermore, because the inclination of the mesh can be optionally set together with the distance between lines of the mesh, the second embodiment of the present invention provides the advantage that the instructions regarding the cut location and the direction of the cut can be suitably and quickly conducted when, for example, slicing the subject which comprises one part of an extracted organ and creating a specimen of the subject material.

Still further, by providing the image transmission system with a device to detect the distance between a table on which the camera unit 11 is mounted and the subject, and to detect the zoom of the lens of camera unit 11, when designating the pitch of the mesh, it is possible to set the input pitch number to correspond to the actual dimensions of the image that is photographed. By designating the pitch of the mesh to correspond to the dimensions of the photographed image, the size of the subject can also be determined using the mesh. If the distance between the table on which camera unit 11 is mounted and the subject is fixed, a device to detect the distance between the table and the subject is not necessary.

Figure 5:
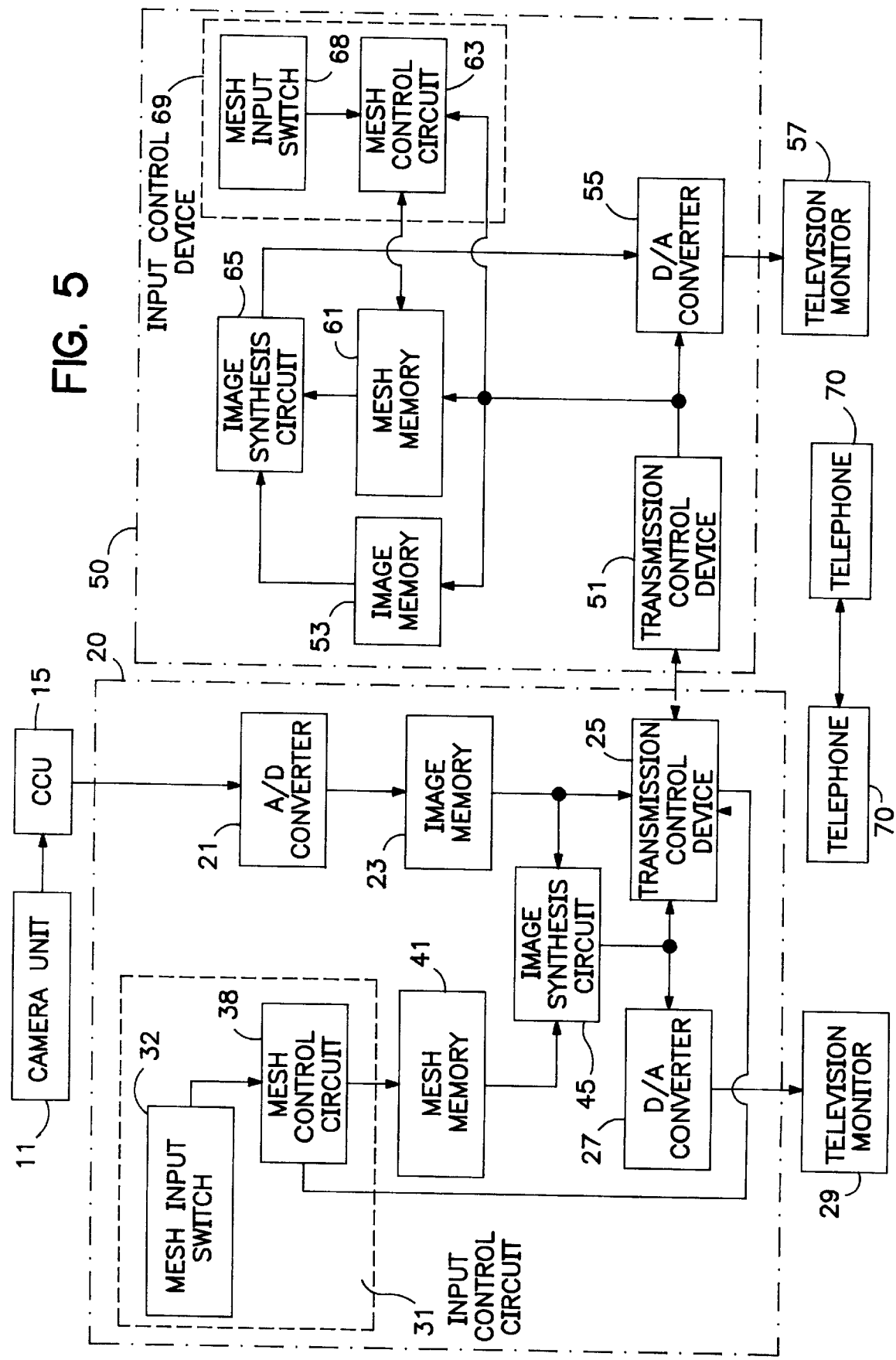
FIG. 5 is a block diagram of an image transmission system in accordance with a third embodiment of the present invention.

FIG. 5 is a block diagram of an image transmission device in accordance with a third embodiment of the present invention. Like reference numerals in the first, second and third embodiments refer to like elements.

In accordance with the third embodiment of the present invention shown in FIG. 5, the transmission device 50 at the reception location is provided with an input control device 69 which is the same as the input control device 31 of image transmission device 20 at the transmission location. By providing input control devices 31 and 69 at the transmission location and reception location, respectively, the mesh setting information may be input and modified at either of the transmission or reception location. Specifically, the input control device 69 includes a mesh input switch 68 to input, at the reception location, the mesh setting information, and a mesh control circuit 63 to set the mesh setting information. The mesh control circuit 63 passes the mesh setting information to the transmission control device 51 where it is transmitted to the transmission control device 25 at the transmission location and then to the mesh control circuit 38. In a like manner, the mesh setting information set at the transmission location is input into the mesh control circuit 63 at the reception location. Because respective input control devices 31 and 69 are provided at the transmission and reception location, the mesh inclination and distance between mesh lines can be suitably adjusted at either the transmission location or the reception location, and even more effective study and discussion can be conducted.

The image transmission device in accordance with the third embodiment of the present invention has the advantage of being extremely effective during long distance diagnoses, and, in particular, long distance pathological diagnoses. For example, during a remote pathological diagnosis, a part to be diagnosed at the remote location (reception location), which may have a size of about up to the first joint of the little finger, is cut out in an operating room at the transmission location. The extracted part is photographed by the CCD camera unit 11 and the image is transmitted to the remote location. While viewing the transmitted image at the remote location, a specialist doctor at the remote location gives directions on the slice position and direction with respect to the part to be diagnosed in order to make a microscope specimen. By having the specialist doctor at the remote location set the mesh at this time using the embodiment of the present invention shown in FIG. 5, the position and direction to be sliced can be suitably instructed while confirming the location that should be pathologically determined. Furthermore, because the same mesh is displayed on the operating room side (transmission location) and the specialist doctor side (reception location), accurate directions can be given.

Moreover, when transmitting the slice position to the remote location, the images are taken by superimposing a fixed indicator (object), such as a grid scale of a fixed dimension, onto the subject, and an image could be created in which the scale and the subject are synthesized. Nonetheless, the parts which are cut out during actual surgery vary in size, and it is difficult to mount the subject in the field of vision of camera unit 11 such that the scale direction and the direction to be sliced agree.

In accordance with the third embodiment of the present invention, because the inclination of and the distance between the parallel and equidistant straight lines which make up the mesh can be optionally set at either the transmission location or the reception location, the subject may be positioned in the visual field of camera unit 11 when the subject is photographed without paying attention to the direction of the extracted part and the direction of the camera for the purpose of preparing the specimen.

Then, keeping the specimen, such as an organ, stationary, the location to be cut can be suitably indicated on the image by changing the angle of inclination of the lines comprising the mesh, the distance between the lines and the number of lines. In the above-described manner, the slice position and direction for a subject can be transmitted to the remote location.

Moreover, the specimen is normally sliced and prepared such that a part which is cut out is cut and divided following a given direction, for example, the direction of the mesh. The mesh in accordance with the embodiments of the present invention fully provides the necessary function as an index for indicating the position and direction of a cut.

As described above, according to the third embodiment of the present invention, the same image can be observed at the transmission location and the reception location, and the inclination of the lines and the distance between the lines which comprise the mesh that is synthesized with the subject image can be optionally set from both the transmission location and the reception location based on the observed image.

Figure 6:
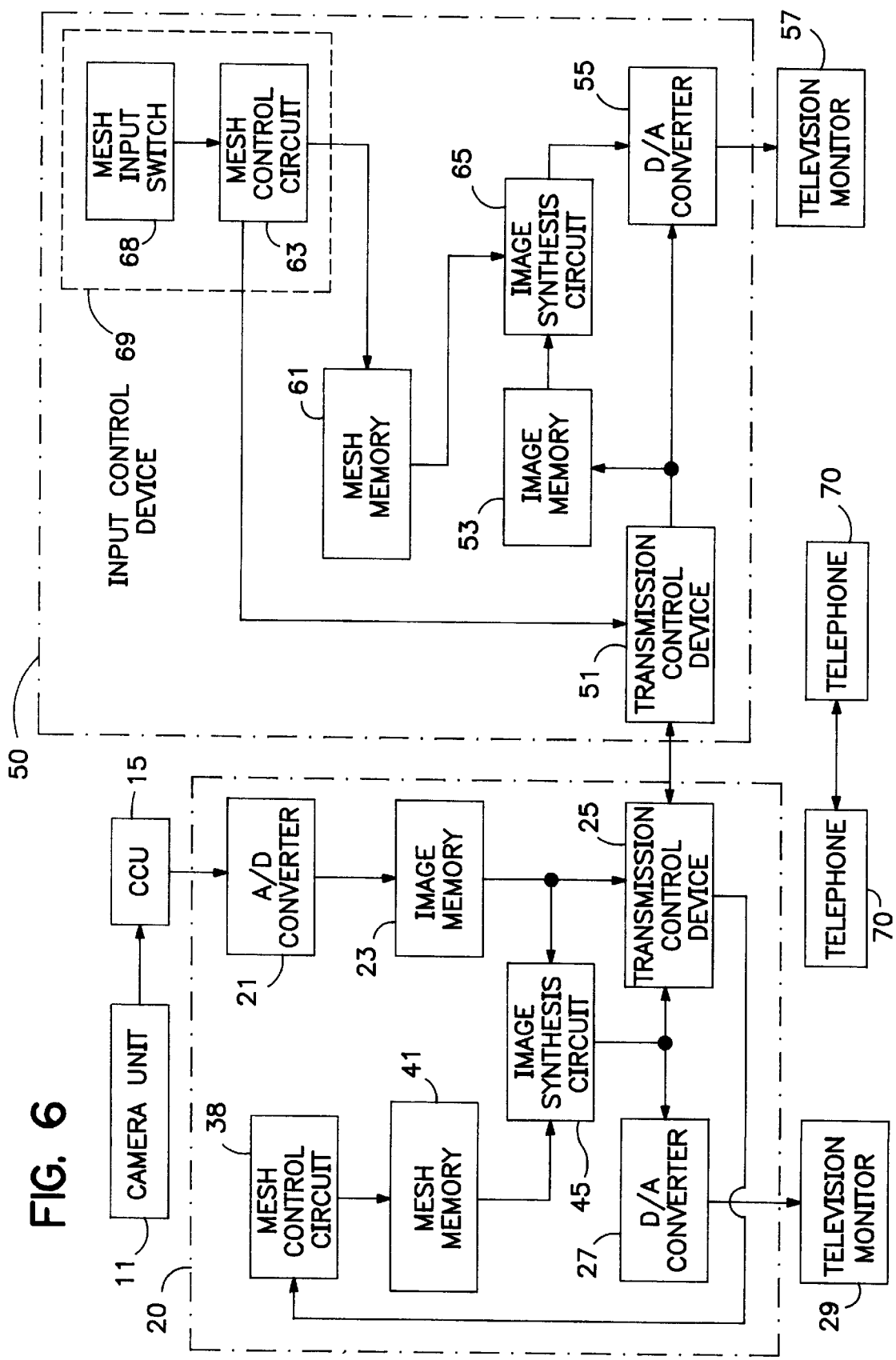
FIG. 6 is a block diagram of an image transmission system in accordance with a fourth embodiment of the present invention.

FIG. 6 is a block diagram of an image transmission system in accordance with a fourth embodiment of the present invention. Like elements in the first, second, third and fourth embodiments are referred to by like reference numerals.

In accordance with the fourth embodiment of the present invention, the transmission device 50 at the reception location includes input control circuit 69 and the image transmission device 20 at the transmission location includes only mesh control circuit 38, with the mesh input switch omitted. As a result, the mesh cannot be set at the transmission location.

According to the fourth embodiment of the present invention, an image transmission system is provided in which the system at an operating room side (transmission location) is configured inexpensively because the mesh input switch is omitted. Further, since the mesh is set by a pathologist at the reception location, who can perform a more accurate diagnosis, effective setting of the mesh can be made.

According to the fourth embodiment of the present invention, the image transmission device at the transmission location can be simplified, and the system at the transmission location (operating room side) can be configured inexpensively. Thus, the cut location is indicated by setting the inclination angle and distance between the lines of the mesh only at the reception location where a more precise diagnosis can be made.

Figure 7:
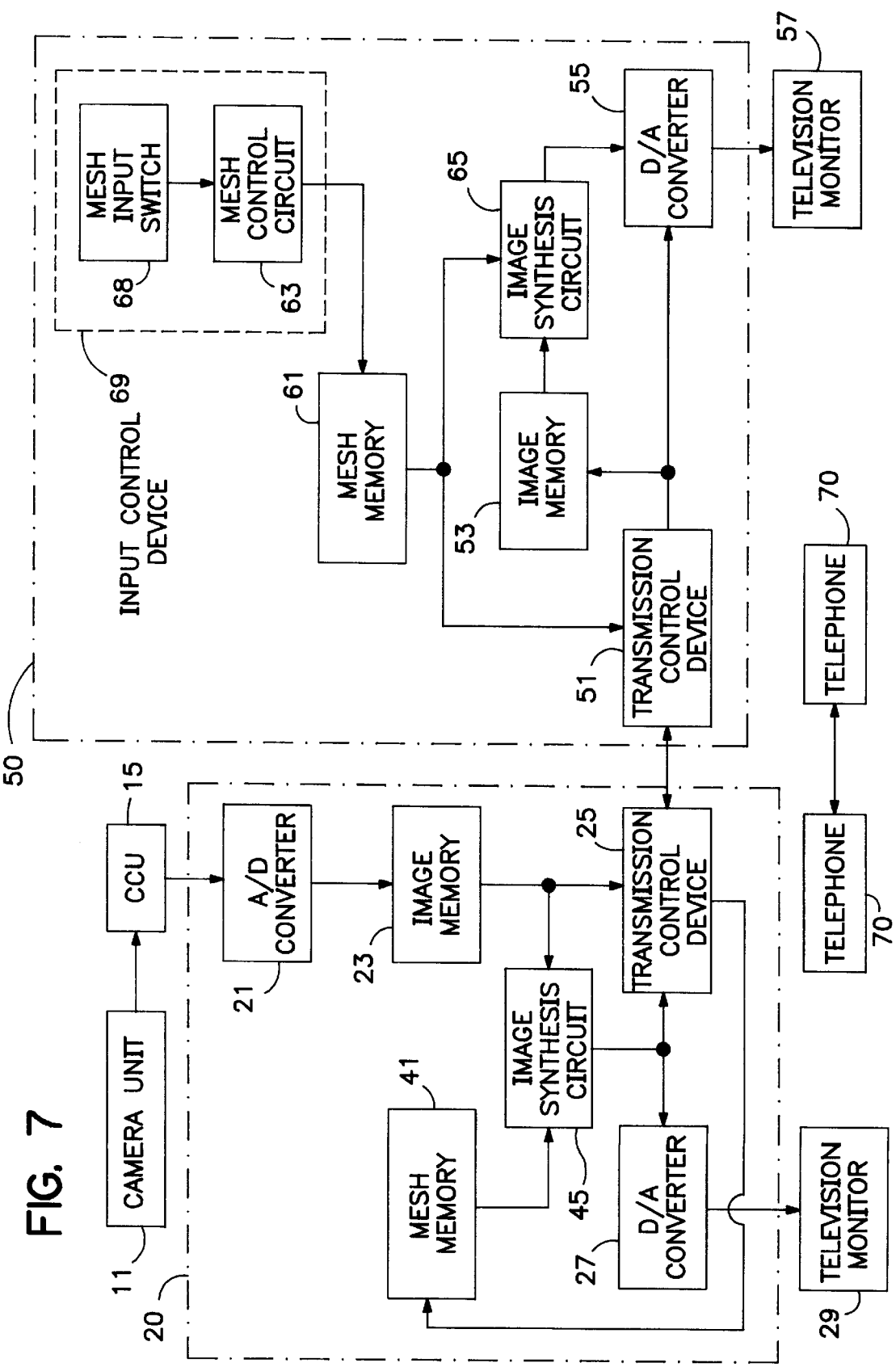
FIG. 7 is a block diagram of an image transmission system in accordance with a fifth embodiment of the present invention.

FIG. 7 is a block diagram of an image transmission system in accordance with a fifth embodiment of the present invention. Like elements in the first, second, third, fourth and fifth embodiments are referred to by like reference numerals.

In accordance with the fifth embodiment of the present invention, mesh control circuit 38 of image transmission device 20 at the transmission location is omitted from the fourth embodiment shown in FIG. 6. The configuration of image transmission device 20 shown in FIG. 7 is even more simplified than that of the image transmission device shown in FIG. 6.

In accordance with the fifth embodiment of the present invention, the mesh image data that is formed by input control device 69 provided in transmission device 50 at the reception location is stored in mesh memory 61. The mesh image data formed by input control circuit 69 is also sent to the image transmission device 20 at the transmission location, and is stored in mesh memory 41 at the transmission location. As a result, the same mesh image data is stored in the mesh memories 41 and 61 at the transmission location and the reception location, respectively. In the above-described manner, the mesh image data is sent to the remote location without mesh setting information. The mesh image data is a larger volume of data compared to the mesh setting information data, but the mesh image data is a smaller volume of data than the synthesized image data of the subject image and the mesh image. Accordingly, if only the mesh image data is transmitted, the transmission time can be shortened compared to transmitting the synthesized image data. For this reason, if the mesh settings have been modified at the reception location, the synthesized image can be immediately displayed at the transmission location by transmitting only the mesh image data to the transmission location, and, in addition, the costs of communication can also be controlled.

Figure 8:
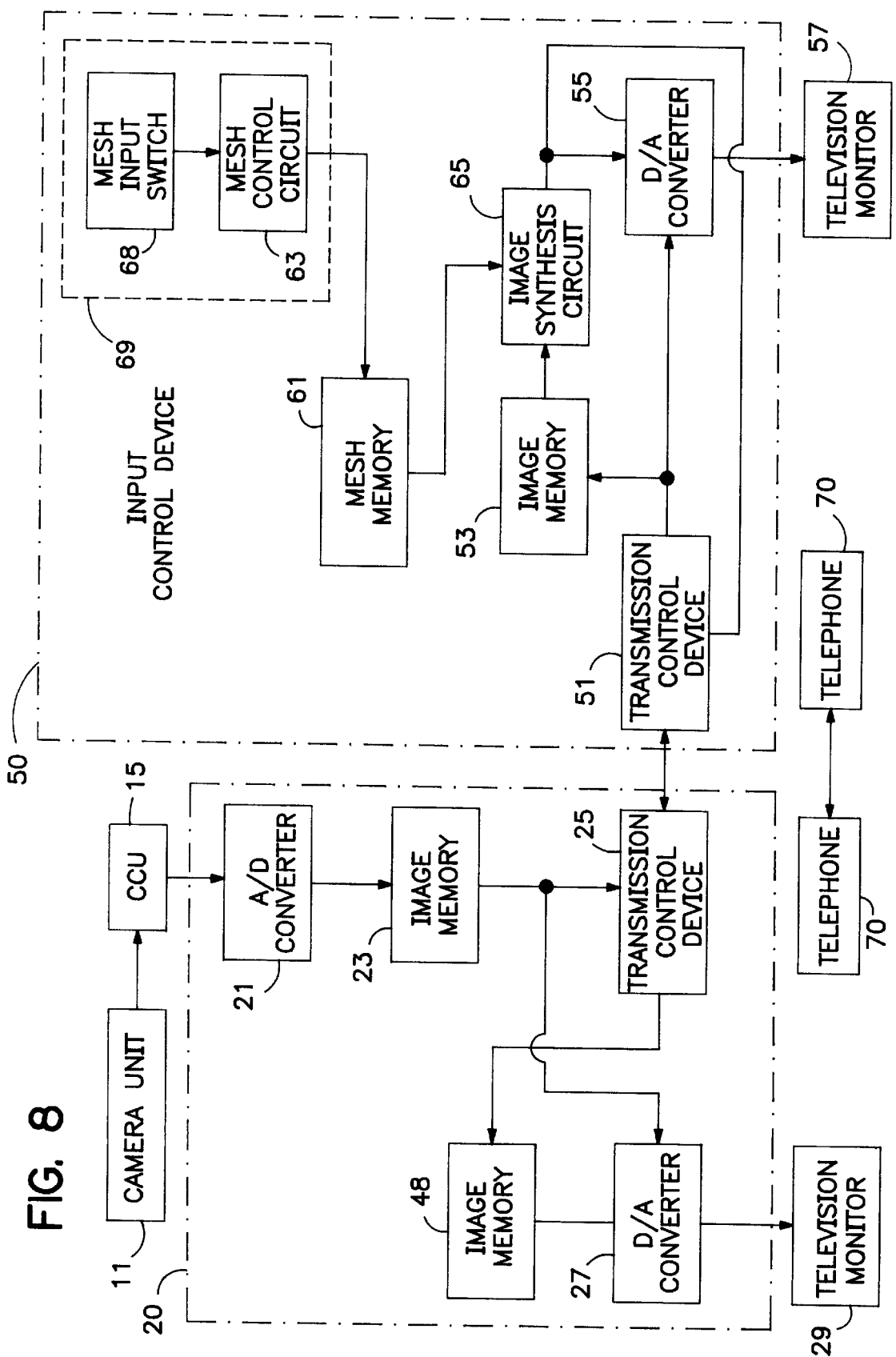
FIG. 8 is a block diagram of an image transmission system in accordance with a sixth embodiment of the present invention.

FIG. 8 is a block diagram of an image transmission system in accordance with a sixth embodiment of the present invention. Like elements in the first, second, third, fourth, fifth, and sixth embodiments are referred to by the same reference numerals.

In accordance with the sixth embodiment of the present invention, the mesh memory 41 and the image synthesis circuit 45 at the transmission location are omitted from the configuration of the image transmission device 20 in the embodiment shown in FIG. 7, and an image memory 48 is provided at the transmission location.

The sixth embodiment of the present invention is particularly advantageous if the transmission volume of the communications circuit is large, and it is possible to transmit images having a great volume of data in a short period of time. In accordance with the sixth embodiment of the present invention, the image data which has been stored in image memory 23 of image transmission device 20 is transmitted to transmission device 50 at the reception location, and stored in image memory 53. The mesh image data and the transmitted image data are synthesized by image synthesis circuit 65 of transmission device 50. The synthesized image data is returned to image transmission device 20 at the transmission location, and is stored in image memory 48. In the above-described manner, the same image can be monitored at both the transmission location and the reception location. The image transmission device 20 in accordance with the sixth embodiment shown in FIG. 8 is even more simplified than the image transmission device shown in FIG. 7.

Furthermore, although the image transmission device 20, in accordance with the embodiments of the present invention, has been described as including an A/D converter 21 to convert the analog signals from camera control unit 15 into digital signals, the present invention is not limited to using an A/D converter. For example, if a digital camera which outputs digital image signals is used, the A/D converter 21 is not necessary. Moreover, if a monitor which can input digital image signals is utilized to display the image at the transmission and reception locations, digital-to-analog converters 27 and 55 are not necessary.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. An image communication system for displaying a subject image imaged by a camera unit, comprising:
   an image transmission device to form a synthesized image by synthesizing a mesh image and the subject image imaged by the camera unit to display the synthesized image, and to transmit the subject image, the image transmission device including,
      a mesh setting device to set mesh image data forming the mesh image, the mesh setting device including a mesh input switch to set mesh setting information for forming the mesh image data, and a mesh control circuit to form the mesh image data based on the mesh setting information, and
      an image synthesis circuit to synthesize subject image data representing the subject image and the mesh image data to form the synthesized image data; and
   an image reception device to receive the subject image transmitted by the image transmission device, to form a synthesized image by synthesizing the subject image with a mesh image and to display the synthesized image,
   wherein the mesh image comprises a plurality of straight lines which are parallel and equidistant and the mesh input switch sets mesh information including a distance between the straight lines, a number of the straight lines and an angle of inclination of the straight lines, and the mesh control circuit forms mesh image data corresponding to the mesh information set by the mesh input switch.

2. An image communication system for displaying a subject image imaged by a camera unit, comprising:
   an image transmission device to form a synthesized image by synthesizing a mesh image and the subject image imaged by the camera unit to display the synthesized image, and to transmit the subject image, the image transmission device including,
      a mesh setting device to set mesh image data forming the mesh image, the mesh setting device including a mesh input switch to set mesh setting information for forming the mesh image data, and a mesh control circuit to form the mesh image data based on the mesh setting information, and
      an image synthesis circuit to synthesize subject image data representing the subject image and the mesh image data to form the synthesized image data; and
   an image reception device to receive the subject image transmitted by the image transmission device, to form a synthesized image by synthesizing the subject image with a mesh image and to display the synthesized image, the image reception device including a mesh control circuit to form mesh image data, and a mesh memory to store the mesh image data,
   wherein the image transmission device mesh control circuit transmits mesh setting information directly to the reception device mesh control circuit to change the mesh setting at the reception device.

3. An image communication system as recited in claim 2, wherein the image reception device further comprises:
   an image memory to store subject image data received from the transmission device; and
   an image synthesis circuit to synthesize the mesh image data stored in the image reception device mesh memory and the subject image data stored in the image reception device image memory.

4. An image communication device for displaying a subject image imaged by a camera unit, comprising:
   an image transmission device to form mesh image data representing a mesh image and to synthesize the mesh image data with subject image data from the camera unit representing the image of the subject to form synthesized image data for transmission, the image transmission device including
      a mesh setting device to set mesh image data forming the mesh image, the mesh setting device including a mesh input switch to set mesh setting information for forming the mesh image data, and a mesh control circuit to form the mesh image data based on the mesh setting information, and
      an image synthesis circuit to synthesize subject image data representing the subject image and the mesh image data to form the synthesized image data; and
   a reception device to receive the synthesized image transmitted by the image transmission device, the reception device including
      a reception device mesh setting device to set mesh image data forming a mesh image;
      a reception device image memory to store subject image data representing the image of the subject; and
      a reception device image synthesis circuit to synthesize the subject image data stored in the reception device image memory and the mesh image data stored in the reception device mesh memory to form a synthesized image, wherein
      the mesh image data is settable by both the transmission device and the reception device, and the mesh image data set at the reception device is transmitted to the transmission device.

5. An image communication system for displaying a subject image imaged by a camera unit, comprising:

an image transmission device to form mesh image data representing a mesh image and to synthesize the mesh image data with subject image data from the camera unit representing the image of the subject to form synthesized image data for transmission;

an image reception device to receive the subject image transmitted by the image transmission device, to form a synthesized image by synthesizing the subject image with a mesh image and to display the synthesized image; and a reception device to receive the synthesized image transmitted by the image transmission device, the reception device including:
   a mesh setting device to set mesh image data forming the mesh image; and
   an image synthesis circuit to synthesize the subject image data and the mesh image data to form a synthesized image.

6. An image communication system as recited in claim 5, wherein the mesh setting device comprises:
   a mesh input switch to set mesh setting information for forming the mesh image data, and
   a mesh control circuit to form the mesh image data.

7. An image communication device as recited in claim 6, wherein the image transmission device comprises a transmission device mesh control circuit to receive the mesh image data set by the mesh setting device, wherein the mesh setting information set by the reception device is used to set the mesh image data at the transmission device.

8. An image communication system, comprising:
   a television camera to produce subject image data representing a subject image;
   an image data memory to store the subject image data produced by the television camera;
   a mesh memory to store mesh image data forming a mesh image comprised of multiple parallel and equidistant straight lines;
   a mesh setting device to set a distance between the straight lines, a number of the straight lines and an angle of inclination of the straight lines comprising the mesh image;
   an image synthesis device to synthesize the image data stored by the mesh memory and the image data stored by the image data memory;
   a communication device to transmit the image synthesized by the image synthesis device; and
   a television monitor to display the synthesized image.

9. An image communication system as recited in claim 8, wherein the mesh setting device sets an ordered code associated with respective parallel straight lines comprising the mesh image.

10. An image communication system, comprising:
    a television camera to produce subject image data representing a subject image;
    a first communication device, including
       a first image data memory to store the subject image data,
       a first mesh setting input device to form mesh image data comprising parallel and equidistant straight lines, wherein the number of straight lines, the distance between the straight lines and the angle of inclination of the straight lines are optionally set,
       a first mesh memory to store the mesh image data set by the mesh setting input device,
       a first image synthesis device to synthesize the mesh image data stored by the first mesh memory and the subject image data stored by the first image data memory,
       a first television monitor to receive the synthesized image data and to display an image corresponding to the synthesized image data,
       a first transmission control device to transmit the synthesized image data,
    a second communication device to receive the synthesized image data transmitted from the first communication device, including
       a second transmission control device to receive the synthesized image data from the first transmission control device,
       a second television monitor to display an image corresponding to the image data received by the second transmission control device.

11. An image transmission system as recited in claim 10, wherein the second communication device to receive the synthesized image data transmitted from the first communication device includes
    a second image data memory to store the subject image data,
    a second mesh memory to store mesh image data,
    a second mesh setting input device to form mesh image data comprising parallel and equidistant straight lines, and
    a second image synthesis device to synthesize image data stored by the second mesh memory and the second image data memory,
    wherein the mesh image displayed on the first and second television monitors is settable by any one of the first mesh setting input device and the second mesh setting input device.

12. An image communication system, comprising:
    a camera to produce subject image data representing a subject image;
    a first communication device to transmit the subject image data, including
       a first image memory to store the subject image data,
       a first transmission control device to transmit the subject image data;
    a first television monitor to display the subject image;
    a second communication device to receive the subject image data transmitted from the first transmission control device, including
       a second image memory to store the subject image data received by the second communication device,
       a first mesh setting device to form mesh image data comprising parallel and equidistant straight lines,
       a first mesh memory to store the mesh image data formed by the first mesh setting device,
       a first image synthesis device to synthesize the image data stored by the first mesh memory and the image data stored by the second image memory,
       a second transmission control device to transmit the synthesized image data to the first communication device; and
    a second television monitor to receive the synthesized image data from the first image synthesis device and to display a synthesized image,
    wherein the second transmission control device transmits the synthesized image data to the first communication device to display the synthesized image on the first television monitor.

13. An image communication system as recited in claim 12, wherein the first communication device further comprises:

a second mesh memory for storing mesh image data transmitted from the first mesh setting device; and a second image synthesis device to synthesize the mesh image data stored in the second mesh memory with the subject image data stored in the first image memory.

14. An image communication system to transmit a subject image to a remote location, comprising:

a camera unit to form subject image data representing a subject image;

an image memory to store the subject image data;

a mesh setting device to set mesh image data to form a mesh image;

a mesh memory to store the mesh image data set by the mesh setting device;

an image synthesis circuit to synthesize the mesh image data and the subject image data to form a synthesized image;

a transmission device to transmit the synthesized image; and a television monitor to display an image corresponding to the synthesized image data.

15. An image communication system as recited in claim 14, wherein the mesh setting device comprises:

a first mesh input switch at a subject image transmission location to set mesh setting information to set the mesh image data;

a first mesh control circuit at the subject image transmission location to form mesh image data based on the mesh setting information set by the first mesh input switch; and a second mesh control circuit at a subject image reception location to form mesh image data based on the mesh setting information set by the first mesh input switch.

16. An image communication system as recited in claim 14, wherein the mesh setting device comprises:

a first mesh setting device at a subject image transmission location to set the mesh image data; and a second mesh setting device at a subject image reception location to set the mesh image data, wherein the first and second mesh setting devices independently set the mesh image data.

17. An image communication system as recited in claim 14, wherein the mesh setting device comprises:

a first mesh input switch at a subject image reception location to set mesh setting information to set the mesh image data;

a first mesh control circuit at the subject image reception location to form mesh image data based on the mesh setting information set by the first mesh input switch; and a second mesh control circuit at a subject image transmission location to form mesh image data based on the mesh setting information set by the first mesh input switch.

18. An image communication system for displaying a subject image imaged by a camera unit, comprising:

an image transmission device to form mesh image data representing a mesh image and to synthesize the mesh image data with subject image data from the camera unit representing the image of the subject to form synthesized image data for transmission, the image transmission device including a mesh setting device to set mesh image data forming the mesh image, the mesh setting device including, a mesh input switch to set mesh setting information for forming the mesh image data, and a mesh control circuit to form the mesh image data based on the mesh setting information; and an image synthesis circuit to synthesize subject image data representing the subject image and the mesh image data to form the synthesized image data, wherein the mesh image comprises a plurality of straight lines which are parallel and equidistant and the mesh input switch sets mesh information including a distance between the straight lines, a number of the straight lines and an angle of inclination of the straight lines, and the mesh control circuit forms mesh image data corresponding to the mesh information set by the mesh input switch.

19. An image communication system for displaying a subject image imaged by a camera unit, comprising:

an image transmission device to form mesh image data representing a mesh image and to synthesize the mesh image data with subject image data from the camera unit representing the image of the subject to form synthesized image data for transmission, the image transmission device including a mesh setting device to set mesh image data forming the mesh image, the mesh setting device including a mesh input switch to set mesh setting information for forming the mesh image data, and a mesh control circuit to form the mesh image data based on the mesh setting information;

an image synthesis circuit to synthesize subject image data representing the subject image and the mesh image data to form the synthesized image data;

a reception device to receive the synthesized image transmitted by the image transmission device, the reception device including a mesh control circuit to form mesh image data, and a mesh memory to store the mesh image data; and a display monitor to display the synthesized image, wherein the transmission device mesh control circuit transmits mesh setting information directly to the reception device mesh control circuit to change the mesh setting at the reception device.

20. An image communication device as recited in claim 19, wherein the reception device further comprises:

an image memory to store subject image data received from the transmission device; and an image synthesis circuit to synthesize the mesh image data stored in the reception device mesh memory and the subject image data stored in the reception device image memory.

21. An image communication system for displaying a subject image imaged by a camera unit, comprising:

an image transmission device to form mesh image data representing a mesh image and to synthesize the mesh image data with subject image data from the camera unit representing the image of the subject to form synthesized image data for transmission, the image transmission device including a mesh setting device to set mesh image data forming the mesh image, the mesh setting device including a mesh input switch to set mesh setting information for forming the mesh image data, and a mesh control circuit to form the mesh image data based on the mesh setting information; and an image synthesis circuit to synthesize subject image data representing the subject image and the mesh image data to form the synthesized image data; and a reception device to receive the synthesized image transmitted by the image transmission device, the reception device including
  a reception device mesh setting device to set mesh image data forming a mesh image,
  a reception device image memory to store subject image data representing the image of the subject, and
  a reception device image synthesis circuit to synthesize the subject image data stored in the reception device image memory and the mesh image data stored in the reception device mesh memory to form a synthesized image,
wherein the mesh image data is settable by both the transmission device and the reception device, and the mesh image data set at the reception device is transmitted to the transmission device.

22. An image communication system for displaying a subject image imaged by a camera unit, comprising:
an image transmission device to form mesh image data representing a mesh image and to synthesize the mesh image data with subject image data from the camera unit representing the image of the subject to form synthesized image data for transmission; and
a reception device to receive the synthesized image transmitted by the transmission device, wherein the reception device comprises
  a mesh setting device to set mesh image data forming the mesh image, and
  an image synthesis circuit to synthesize the subject image data and the mesh image data to form a synthesized image.

23. An image communication system as recited in claim 22, wherein the mesh setting device comprises:
  a mesh input switch to set mesh setting information for forming the mesh image data, and
  a mesh control circuit to form the mesh image data.

24. An image communication device as recited in claim 23, wherein the image transmission device comprises a transmission device mesh control circuit to receive the mesh image data set by the mesh setting device, wherein the mesh setting information set by the reception device is used to set the mesh image data at the transmission device.

25. An image communication system to transmit a subject image to a remote location, comprising:
  a camera unit to form subject image data representing a subject image;
  an image memory to store the subject image data;
  a mesh setting device to set mesh image data to form a mesh image, the mesh setting device comprising
    a first mesh input switch at a subject image transmission location to set mesh setting information to set the mesh image data,
    a first mesh control circuit at the subject image transmission location to form mesh image data based on the mesh setting information set by the first mesh input switch, and
    a second mesh control circuit at a subject image reception location to form mesh image data based on the mesh setting information set by the first mesh input switch;
  a mesh memory to store the mesh image data set by the mesh setting device;
  an image synthesis circuit to synthesize the mesh image data and the subject image data to form a synthesized image;
  a transmission device to transmit the synthesized image; and
  a television monitor to display an image corresponding to the synthesized image data.

26. An image communication system to transmit a subject image to a remote location, comprising:
  a camera unit to form subject image data representing a subject image;
  an image memory to store the subject image data;
  a mesh setting device to set mesh image data to form a mesh image, the mesh setting device including
    a first mesh setting device at a subject image transmission location to set the mesh image data, and
    a second mesh setting device at a subject image reception location to set the mesh image data, wherein the first and second mesh setting devices independently set the mesh image data,
  a mesh memory to store the mesh image data set by the mesh setting device;
  an image synthesis circuit to synthesize the mesh image data and the subject image data to form a synthesized image;
  a transmission device to transmit the synthesized image; and
  a television monitor to display an image corresponding to the synthesized image data.

27. An image communication system to transmit a subject image to a remote location, comprising:
  a camera unit to form subject image data representing a subject image;
  an image memory to store the subject image data;
  a mesh setting device to set mesh image data to form a mesh image, the mesh setting device including,
    a first mesh input switch at a subject image reception location to set mesh setting information to set the mesh image data,
    a first mesh control circuit at the subject image reception location to form mesh image data based on the mesh setting information set by the first mesh input switch, and
    a second mesh control circuit at a subject image transmission location to form mesh image data based on the mesh setting information set by the first mesh input switch;
  a mesh memory to store the mesh image data set by the mesh setting device;
  an image synthesis circuit to synthesize the mesh image data and the subject image data to form a synthesized image;
  a transmission device to transmit the synthesized image; and
  a television monitor to display an image corresponding to the synthesized image data.

* * * * *